United States Patent
Jeong

(10) Patent No.: US 6,924,962 B2
(45) Date of Patent: Aug. 2, 2005

(54) APPARATUS TO BUFFER VIBRATION AND SUPPORT AN ACTUATOR OF A HARD DISK DRIVE

(75) Inventor: Ki-tag Jeong, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 149 days.

(21) Appl. No.: 10/361,818

(22) Filed: Feb. 11, 2003

(65) Prior Publication Data

US 2003/0156358 A1 Aug. 21, 2003

(30) Foreign Application Priority Data

Feb. 16, 2002 (KR) .......................................... 2002-8307

(51) Int. Cl.[7] .............................. G11B 5/48; G11B 5/55
(52) U.S. Cl. ................................. 360/265.6; 360/265.4
(58) Field of Search ........................... 360/265.2, 265.3, 360/265.4, 265.5, 265.6

(56) References Cited

U.S. PATENT DOCUMENTS

| | | | | |
|---|---|---|---|---|
| 4,945,435 A | * | 7/1990 | Boigenzahn et al. | .... 360/265.2 |
| 4,984,115 A | * | 1/1991 | Takahashi et al. | ....... 360/265.6 |
| 5,099,374 A | * | 3/1992 | Ohkita et al. | ............ 360/265.6 |
| 5,666,242 A | | 9/1997 | Edwards et al. | ......... 360/265.6 |
| 5,825,585 A | | 10/1998 | Hatam-Tabrizi | ......... 360/97.02 |
| 5,930,071 A | * | 7/1999 | Back | ....................... 360/97.01 |
| 6,256,173 B1 | | 7/2001 | Chee et al. | ............... 360/265.7 |
| 6,466,400 B1 | * | 10/2002 | Iwahara et al. | .......... 360/99.08 |
| 6,501,615 B1 | * | 12/2002 | Kelsic et al. | ............. 360/97.02 |

FOREIGN PATENT DOCUMENTS

JP 5-151724 6/1993

* cited by examiner

Primary Examiner—Jefferson Evans
(74) Attorney, Agent, or Firm—Staas & Halsey LLP

(57) ABSTRACT

An actuator supporting apparatus of a hard disk drive includes a pivot bearing including an inner ring, an outer ring, and a rolling member, which are installed coaxially, to support an actuator arm to pivot. The actuator supporting apparatus also includes a support structure to support upper and lower surfaces of the inner ring, and a buffer member interposed between at least one of the upper and lower surfaces of the inner ring and the support structure, to buffer vibrations and impacts. Thus, a feature of buffering vibrations and impacts by the buffer member is not changed and is constantly maintained, regardless of accumulation of manufacture allowance or a change in the environment. Also, a problem in reliability of a product due to deterioration of structural strength, which occurs in the conventional actuator supporting apparatus, does not occur in the actuator supporting apparatus of the present invention.

19 Claims, 7 Drawing Sheets

FIGI. 5B

APPARATUS TO BUFFER VIBRATION AND SUPPORT AN ACTUATOR OF A HARD DISK DRIVE

CROSS REFERENCE TO RELATED APPLICATION

This application claims the benefit of Korean Application No. 2002-8307, filed Feb. 16, 2002, in the Korean Intellectual Property Office, the disclosure of which is incorporated herein by reference.

BACKGROUND OF THE INVENTION

1. Field of the Invention

The present invention relates to a hard disk drive, and more particularly, to an apparatus to support an actuator of a hard disk drive to pivot in a radius direction of a hard disk.

2. Description of the Related Art

In general, a hard disk drive which is an auxiliary memory device of a computer includes a hard disk that rotates at a high speed by a spindle motor installed inside the hard disk drive, and an actuator that has a magnetic head to record/reproduce data on/from a track of the hard disk.

The actuator is installed to pivot around a predetermined pivot shaft. A bobbin and a coil installed at one end of the actuator is moved by an operation of a voice coil motor so that the magnetic head installed at the other end of the actuator moves to a desired track position and records/reproduces data on/from the hard disk. Here, the magnetic head which moves above both sides of a hard disk is lifted by a flow of air on a surface of the hard disk as the hard disk rotates at a high speed and moves, maintaining a fine gap with the hard disk. When the hard disk drive stops or electric power is cut off during the above operation, the actuator moves to a parking area located in an inner circumferential side of the hard disk, so that damage to the hard disk due to contact with the disk and the magnetic head is prevented.

FIG. 1 shows a conventional hard disk drive operating as described above. FIG. 2 illustrates a vertical structure of an actuator supporting apparatus adopted in the hard disk drive of FIG. 1.

Referring to FIG. 1, a hard disk drive includes a housing 1 having a base 2 and a cover 3. A hard disk 4 in which predetermined information is recorded or reproduced, and an actuator 6 having a magnetic head 5 to record and reproduce information are installed in the housing 1. Also, a voice coil motor 7 to pivot the actuator 6 by an electrostatic force is installed in the housing 1. The actuator 6 includes a suspension 8 to support the magnetic head 5 to face a recording surface of the hard disk 4, and an actuator arm 9 to support an end portion of the suspension 8 and to pivot by the voice coil motor 7 in a radial direction of the hard disk 4. The actuator arm 9 is supported to pivot by an actuator supporting apparatus 10 installed in the housing 1.

The actuator supporting apparatus 10, as shown in FIG. 2, includes a pivot bearing 14 including an inner ring 11, an outer ring 12, and a rolling member 13 interposed between the inner ring 11 and the outer ring 12, to support the actuator arm 9 to pivot. The pivot bearing 14 is fixed on an upper surface of the base 2 by a first coupling member 15 coupled to a mounting boss 2a vertically extended from the base 2. A damper 17 interposed between the cover 3 and the first coupling member 15 is fixed to the first coupling member 15 by a second coupling member 16 that is complementarily coupled to the first coupling member 15. Here, the damper 17 includes a plate 18 having a predetermined strength and an adhesive layer 19 deposited on the plate 18. The damper 17 adheres to the cover 3 by an adhesive force of the adhesive layer 19. Also, the adhesive layer 19 buffers vibrations and impacts transferred between the housing 1 and the actuator arm 9.

However, in the above conventional actuator supporting apparatus 10, due to accumulated manufacture allowance of constituent parts of the actuator supporting apparatus 10, as shown in FIG. 2, a gap may occur between the damper 17 and the first coupling member 15. Here, when the second coupling member 16 is coupled to the first coupling member 15, the damper 17 interposed between the first coupling member 15 and the second coupling member 15 receives a force acting downward and is pushed toward the first coupling member 15 and closely fixed thereto. Thus, a coupling force between the damper 17 and the cover 3 adhering to each other becomes weak so that the coupling between the damper 17 and the cover 3 is loose. The loose coupling between the damper 17 and the cover 3 deteriorates a feature of buffering vibrations and impacts by the damper 17. Also, the adhesive force of the adhesive layer 19 decreases by a change in environment, in particular, at a high temperature, so that the feature of buffering vibrations and impacts by the damper 17 is further lowered. Also, the lowering of the coupling force between the cover 3 and the damper 17 lowers a structural strength of the actuator supporting apparatus 10 which may deteriorate reliability of a product.

Therefore, an actuator supporting apparatus having a new structure is needed which may not only support the actuator to pivot, but also buffer vibrations and impacts between the housing and the actuator arm, regardless of accumulated allowance of a product or a change in the external environment.

SUMMARY OF THE INVENTION

Accordingly, it is an aspect of the present invention to provide an apparatus to support an actuator to pivot and effectively reduce vibrations and impacts between a housing and the actuator.

Additional aspects and advantages of the invention will be set forth in part in the description which follows and, in part, will be obvious from the description, or may be learned by practice of the invention.

The foregoing and/or other aspects of the present invention are achieved by providing an actuator supporting apparatus of a hard disk drive including a pivot bearing having an inner ring, an outer ring, and a rolling member, which are installed coaxially, to support an actuator arm to pivot. The apparatus also includes a support structure to support upper and lower surfaces of the inner ring, and a buffer member interposed between at least one of the upper and lower surfaces of the inner ring and the support structure, to buffer vibrations and impacts.

BRIEF DESCRIPTION OF THE DRAWINGS

The above and/or other aspects and advantages of the present invention will become more appreciated from the following description of the preferred embodiments, taken in conjunction with the accompanying drawings of which:

FIGS. 4A, 4B, 5A, and 5B are views illustrating various embodiments of a buffer member;

DETAILED DESCRIPTION OF THE PREFERRED EMBODIMENTS

Figure 1:
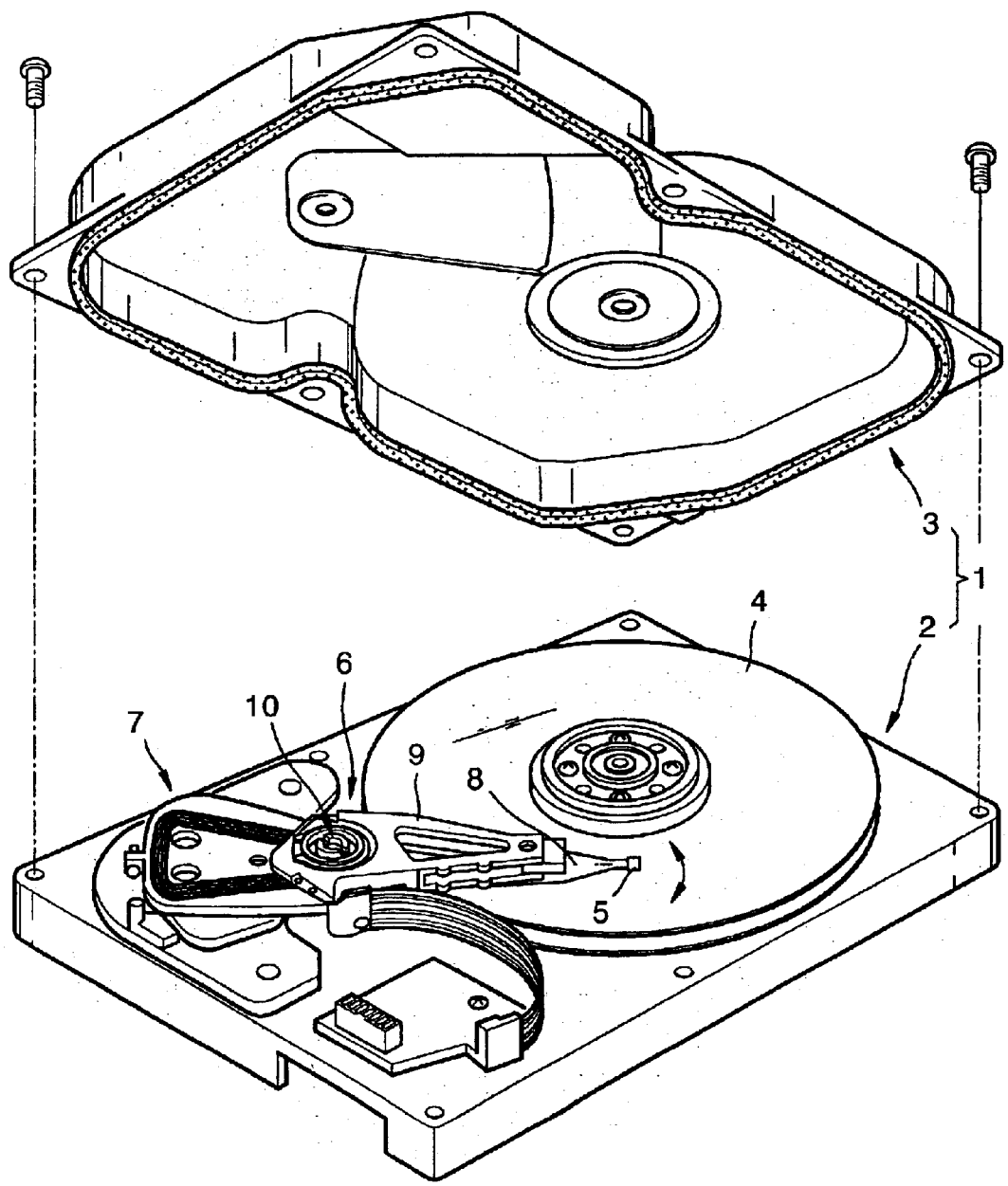
FIG. 1 is a perspective view illustrating a conventional hard disk drive.
Figure 2:
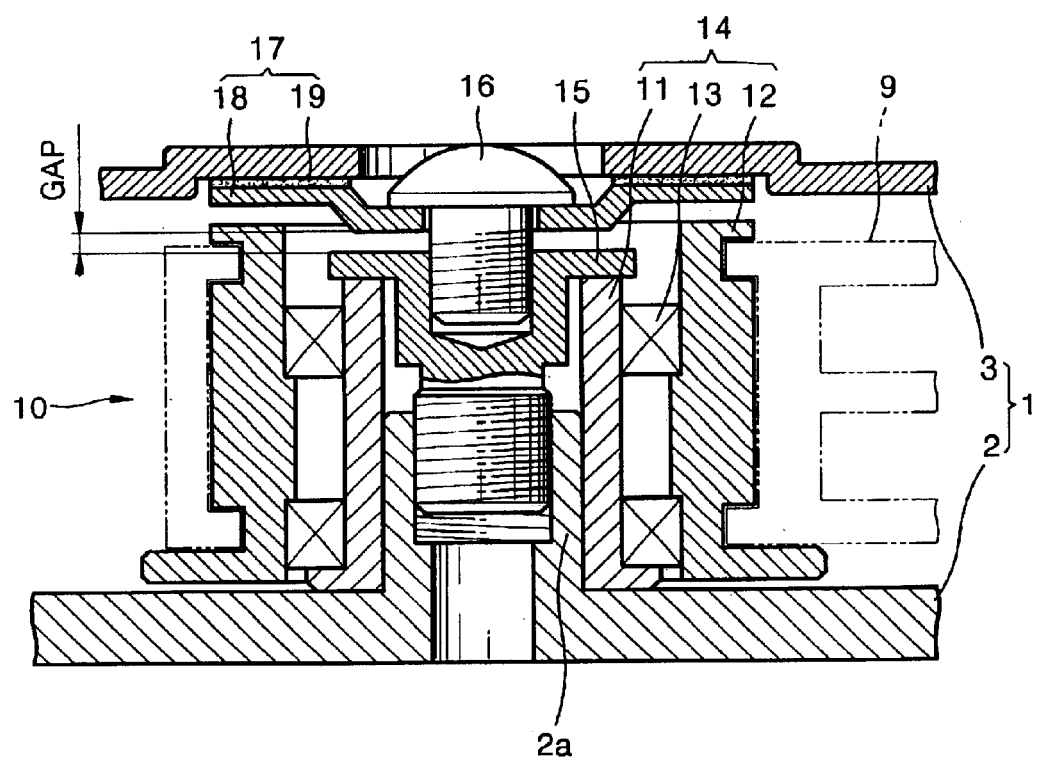
FIG. 2 is a sectional view illustrating a vertical structure of an actuator supporting apparatus adopted in the hard disk drive of FIG. 1.

Reference will now be made in detail to the present preferred embodiments of the present invention, examples of which are illustrated in the accompanying drawings, wherein like reference numerals refer to like elements throughout.

Figure 3:
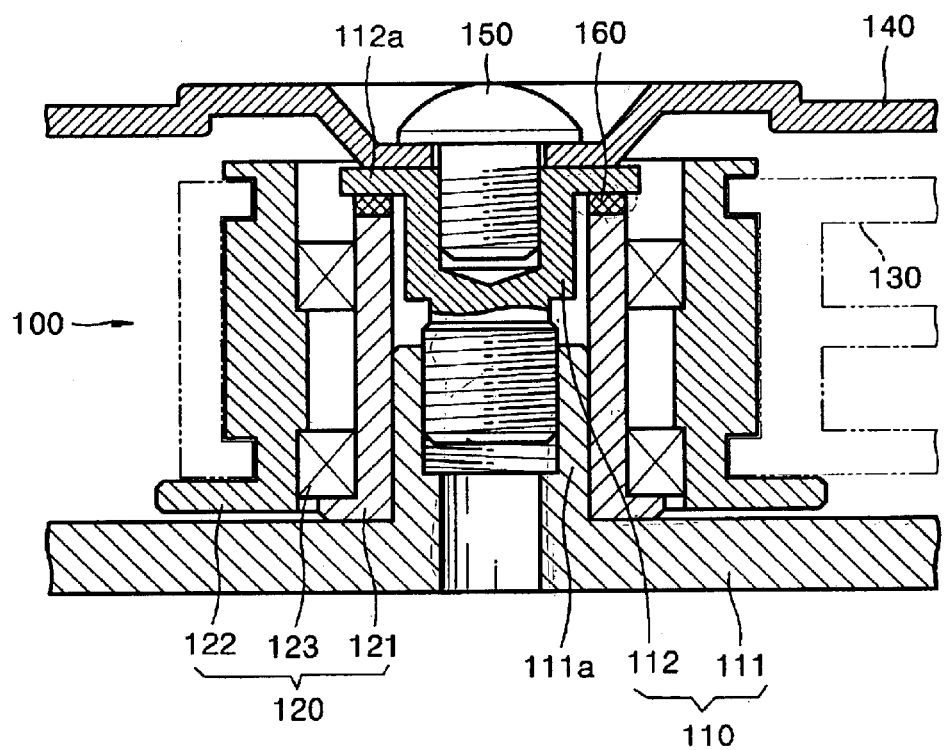
FIG. 3 is a sectional view illustrating a vertical structure of an actuator supporting apparatus, according to an embodiment of the present invention.

Referring to FIG. 3, an actuator supporting apparatus 100 of a hard disk drive according to an embodiment of the present invention includes a pivot bearing 120 including an inner ring 121, an outer ring 122, and a plurality of rolling members 123 arranged in two vertical rows between the inner ring 121 and the outer ring 122, which are installed coaxially. The actuator supporting apparatus 100 also includes a support structure 110 including a first coupling member 112 coupled to a base 111 where the inner ring 121 is accommodated, and a mounting boss 111a vertically extending from the base 111, to support upper and lower surfaces of the inner ring 121. The actuator supporting apparatus 100 includes a second coupling member 150 coupled to the first coupling member 112 to fix a cover 140 to the first coupling member 112, and a buffer member 160 interposed between a flange portion 112a of the first coupling member 112, and an upper surface of the inner ring 121, to reduce vibrations and impacts.

Here, as the upper and lower surfaces of the inner ring 121 are supported by the upper surface of the base 111 and the flange portion 112a of the first coupling member 112, the actuator arm 130 is supported to pivot.

Also, the buffer member 160 interposed between the flange portion 112a of the first coupling member 112 and the upper surface of the inner ring 121 absorbs vibration energy and impacts transferred between the cover 140 and the pivot bearing 120, so that vibrations and impacts transferred between the cover 140 and the actuator arm 130 are reduced.

Figure 4A:
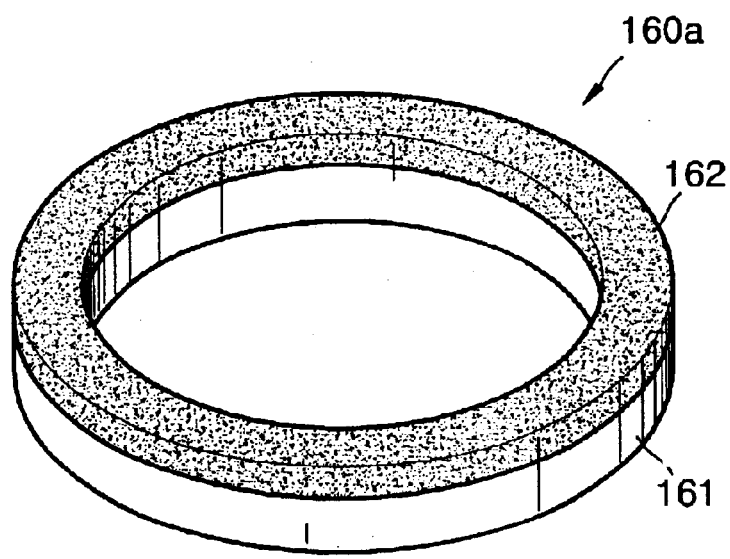
Figure 4B:
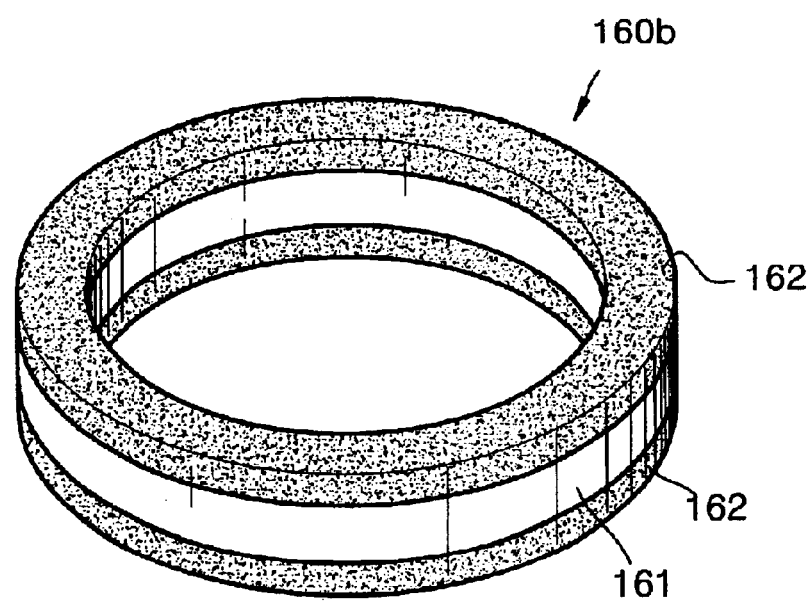

FIGS. 4A and 4B are perspective views for explaining embodiments of the buffer members. Referring to FIGS. 4A and 4B, the buffer members 160a and 160b each includes a plate 161 having a predetermined strength and a damping member 162 deposited at at least one of both side surfaces of the plate 161. FIG. 4A shows the buffer member 160a where the damping member 162 is deposited on one side surface of the plate 161. FIG. 4B shows the buffer member 160b where the damping member 162 is deposited on both side surfaces of the plate 161.

Figure 5A:
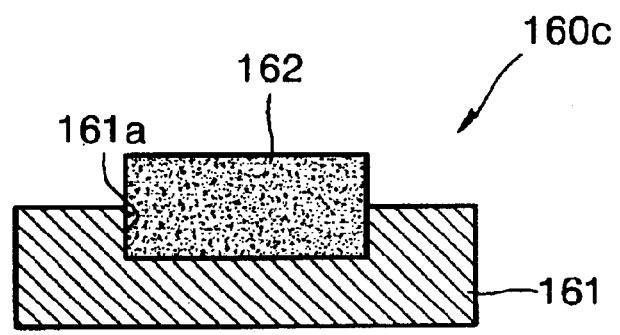
Figure 5A:
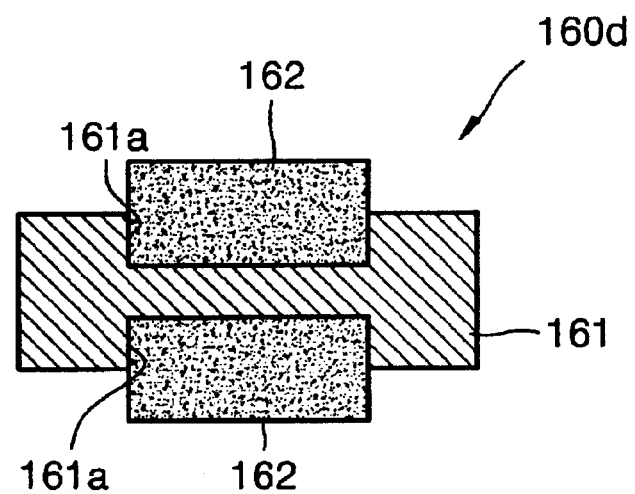

FIGS. 5A and 5B are sectional views of additional embodiments of the buffer member. Referring to FIG. 5A, a buffer member 160c includes the plate 161 where a groove 161a has a uniform width and a predetermined depth, and the damping member 162 is inserted in the groove 161a of the plate 161. Also, as shown in FIG. 5B, the buffer member 160d may include the damping member 162 inserted in the groove 161a formed in both side surfaces of the plate 161.

According to the actuator supporting apparatus 100 as described above, the buffer member 160 is interposed between the flange portion 112a of the first coupling member 112 and the upper surface of the inner ring 121 of the pivot bearing 120. Since the cover 140 is directly fixed to the first coupling member 112 by the second coupling member 150, a feature of buffering vibrations and impacts by the buffer member 160 is not changed and is constantly maintained, regardless of accumulation of manufacture allowance of parts forming the actuator supporting apparatus 100 or a change in the environment.

Figure 6:
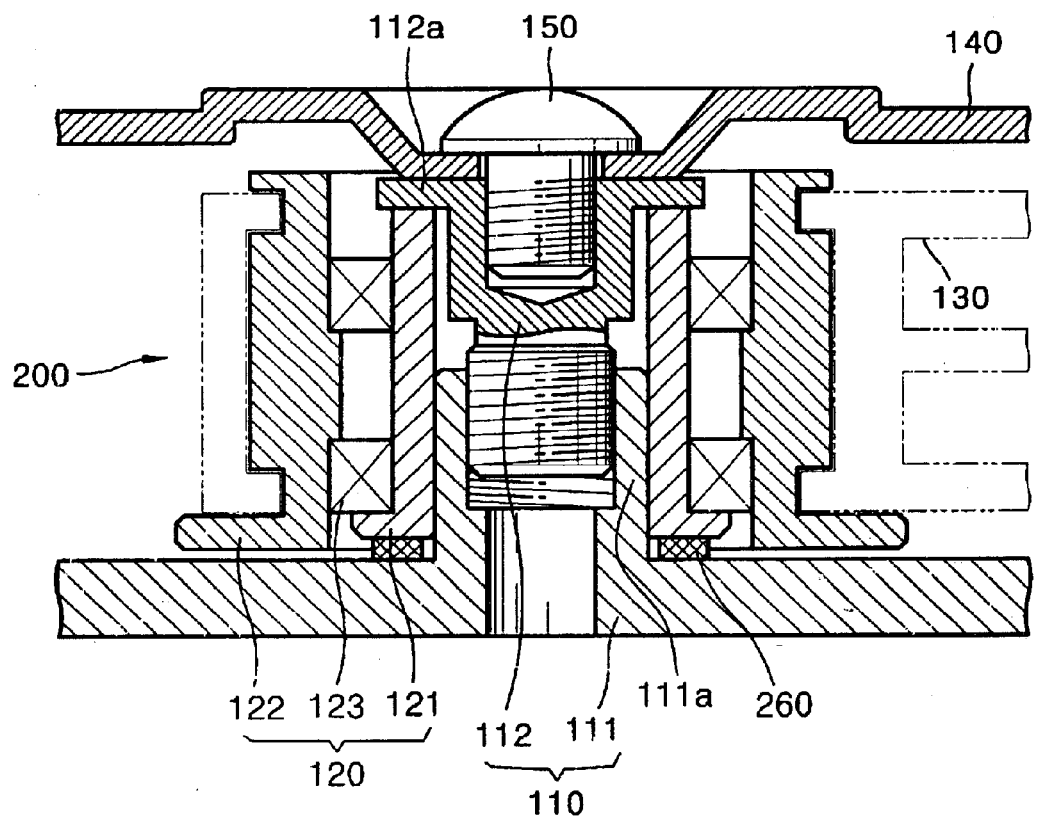
FIG. 6 is a sectional view illustrating a vertical structure of an actuator supporting apparatus, according to another embodiment of the present invention.

Next, referring to FIG. 6, an actuator supporting apparatus 200 of a hard disk drive, according to another embodiment of the present invention includes the pivot bearing 120 including the inner ring 121, the outer ring 122, and a plurality of the rolling members 123 arranged in two vertical rows between the inner ring 121 and the outer ring 122, which are installed coaxially, to support the actuator arm 130 to pivot. The actuator supporting apparatus 200 also includes the support structure 110 including the first coupling member 112 coupled to the base 111 where the inner ring 121 is accommodated and the mounting boss 111a vertically extending from the base 111, to support upper and lower surfaces of the inner ring 121. The actuator supporting apparatus 200 includes the second coupling member 150 coupled to the first coupling member 112 to fix the cover 140 to the first coupling member 112, and a buffer member 260 interposed between the upper surface of the base 111 and the lower surface of the inner ring 121 to buffer vibrations and impacts. Here, the same buffer members 160a, 160b, 160c, and 160d as shown in FIGS. 4A, 4B, 5A, and 5B are used as the buffer member 260. Since the same reference numerals as those shown in FIG. 3 substantially indicate the same elements as shown in FIG. 6, detailed descriptions thereof will be omitted herein.

According to the actuator supporting apparatus 200 having the above-described structure, the buffer member 260 absorbs vibration energy and impacts transferred between the base 111 and the pivot bearing 120, so that the vibrations and impacts transferred between the base 111 and the actuator arm 130 are reduced.

Figure 7:
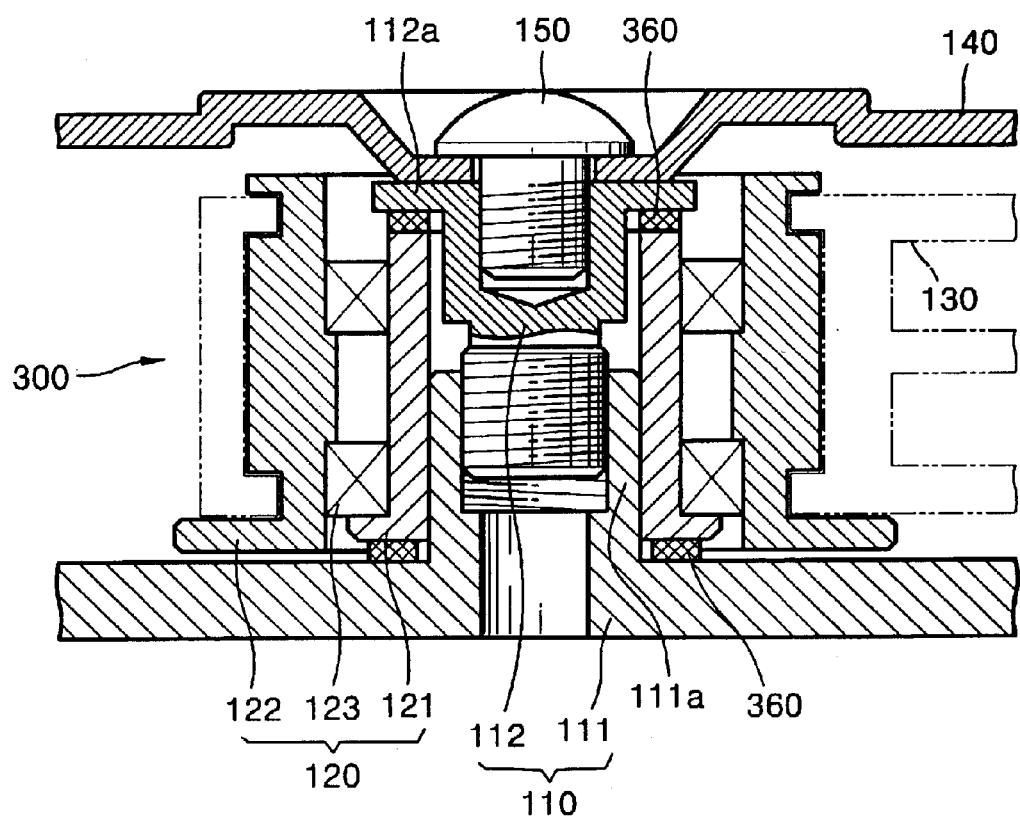
FIG. 7 is a sectional view illustrating a vertical structure of an actuator supporting apparatus, according to another embodiment of the present invention.

Referring to FIG. 7, an actuator supporting apparatus 300 of a hard disk drive, according to another embodiment of the present invention includes the pivot bearing 120 including the inner ring 121, the outer ring 122, and a plurality of the rolling members 123 arranged in two vertical rows between the inner ring 121 and the outer ring 122, which are installed coaxially, to support the actuator arm 130 to pivot. The actuator supporting apparatus 300 also includes the support structure 110 including the first coupling member 112 coupled to the base 111 where the inner ring 121 is accommodated and the mounting boss 111a vertically extending from the base 111, to support upper and lower surfaces of the inner ring 121. The actuator supporting apparatus 300 includes the second coupling member 150 coupled to the first coupling member 112 to fix the cover 140 to the first coupling member 112, and a buffer member 360 to buffer vibrations and impacts respectively interposed between the flange portion 112a of the first coupling member 112 and the upper surface of the inner ring 121 of the pivot bearing 120, and between the upper surface of the base 111 and the lower surface of the inner ring 121. Here, since the same reference numerals as those shown in FIG. 3 indicate the same elements as shown in FIG. 7, detailed descriptions thereof will be omitted herein.

According to the actuator supporting apparatus 300 having the above-described structure, the buffer member 360 absorbs vibration energy and impacts transferred not only between the cover 140 and the pivot bearing 120, but also between the base 111 and the pivot bearing 120, so that the vibrations and impacts transferred between the cover 140 and the base 111, the cover 140 and the actuator arm 130, and the base 111 and the actuator arm 130 are reduced.

As described above, in the parts forming the actuator supporting apparatus of a hard disk drive according to the present invention, a feature of buffering vibrations and impacts by the buffer member is not changed and constantly maintained, regardless of accumulation of manufacture allowance or a change in the environment. Also, a problem in reliability of a product due to deterioration of structural strength, which occurs in the conventional actuator supporting apparatus, does not occur in the actuator supporting apparatus of the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An actuator supporting apparatus of a hard disk drive, comprising:
   a pivot bearing including an inner ring, an outer ring, and a rolling member, which are installed coaxially, to support an actuator arm to pivot;
   a support structure to support upper and lower surfaces of the inner ring, the support structure including a base to accommodate and support the inner ring, a coupling member coupled with the base, and a mounting boss vertically extending from the base; and
   a buffer member interposed between at least one of the upper and lower surfaces of the inner ring and the support structure, to buffer vibrations and impacts.

2. The apparatus as claimed in claim 1, wherein the buffer member is interposed between a flange portion of the coupling member and the upper surface of the inner ring.

3. The apparatus as claimed in claim 1, wherein the buffer member is interposed between an upper surface of the base and the lower surface of the inner ring.

4. The apparatus as claimed in claim 1, wherein the buffer member is respectively interposed between a flange portion of the coupling member and the upper surface of the inner ring, and between an upper surface of the base and the lower surface of the inner ring.

5. An actuator supporting apparatus of a hard disk drive, comprising:
   a pivot bearing including an inner ring, an outer ring, and a rolling member, which are installed coaxially, to support an actuator arm to pivot;
   a support structure to support upper and lower surfaces of the inner ring; and
   a buffer member interposed between at least one of the upper and lower surfaces of the inner ring and the support structure, to buffer vibrations and impacts,
   wherein the buffer member comprises a plate having a predetermined strength, and a damping member deposited on one or both side surfaces of the plate.

6. An actuator supporting apparatus of a hard disk drive, comprising:
   a pivot bearing including an inner ring, an outer ring, and a rolling member, which are installed coaxially, to support an actuator arm to pivot;
   a support structure to support upper and lower surfaces of the inner ring; and
   a buffer member interposed between at least one of the upper and lower surfaces of the inner ring and the support structure, to buffer vibrations and impacts,
   wherein the buffer member comprises a plate having a groove formed along a circumferential direction to have uniform depth and width, and a damping member inserted in the groove.

7. An actuator supporting apparatus of a hard disk drive which includes a housing having a base and a cover, the apparatus comprising:
   a pivot bearing including an inner ring, an outer ring, and a rolling member, which are installed coaxially, to support an actuator arm of the actuator supporting apparatus to pivot;
   a support structure having a first coupling member coupled to the base to support the inner ring accommodated by the base, and a second coupling member coupled to the first coupling member to fix the cover to the first coupling member;
   a mounting boss to vertically extend from the base; and
   a buffer member interposed between a flange portion of the first coupling member and the inner ring to buffer vibrations and impacts.

8. The apparatus as claimed in claim 7, wherein the inner ring is coupled to the base and flange portion of the first coupling member, so that the actuator arm is supported to pivot.

9. The apparatus as claimed in claim 7, wherein the buffer member interposed between the flange portion of the first coupling member and the inner ring absorbs vibration energy and impacts transferred between the cover and the pivot bearing, so that vibrations and impacts transferred between the cover and the actuator arm are reduced.

10. An actuator supporting apparatus of a hard disk drive which includes a housing having a base and a cover, the apparatus comprising:
    a pivot bearing including an inner ring, an outer ring, and a rolling member, which are installed coaxially, to support an actuator arm of the actuator supporting apparatus to pivot;
    a support structure having a first coupling member coupled to the base to support the inner ring accommodated by the base, and a second coupling member coupled to the first coupling member to fix the cover to the first coupling member;
    a mounting boss to vertically extend from the base; and
    a buffer member interposed between the base and the inner ring to buffer vibrations and impacts.

11. The apparatus as claimed in claim 10, wherein the inner ring is coupled to the base and flange portion of the first coupling member, so that the actuator arm is supported to pivot.

12. The apparatus as claimed in claim 10, wherein the buffer member interposed between the base and the inner ring absorbs vibration energy and impacts transferred between the base and the pivot bearing, so that vibrations and impacts transferred between the base and the actuator arm are reduced.

13. An actuator supporting apparatus of a hard disk drive which includes a housing having a base and a cover, the apparatus comprising:
    a pivot bearing including an inner ring, an outer ring, and a rolling member, which are installed coaxially, to support an actuator arm of the actuator supporting apparatus to pivot;

a support structure having a first coupling member coupled to the base to support the inner ring accommodated by the base, and a second coupling member coupled to the first coupling member to fix the cover to the first coupling member;

a mounting boss to vertically extend from the base; and a buffer member interposed between a flange portion of the first coupling member and the inner ring, and between the base and the inner ring to buffer vibrations and impacts.

14. The apparatus as claimed in claim 13, wherein the inner ring is coupled to the base and flange portion of the first coupling member, so that the actuator arm is supported to pivot.

15. The apparatus as claimed in claim 13, wherein the buffer member absorbs vibration energy and impacts transferred between the cover and the pivot bearing, and the base and the pivot bearing, respectively, so that vibrations and impacts transferred between the cover and the base, the cover and the actuator arm, and the base and the actuator arm are reduced.

16. An actuator supporting apparatus of a hard disk drive that includes a housing having a base and a cover, the apparatus comprising:

a pivot bearing including an inner ring, an outer ring, and a rolling member, which are installed coaxially, to pivotably support an actuator arm of the actuator supporting apparatus;

a support structure having a first coupling member coupled to the base to support the inner ring accommodated by the base, and a second coupling member coupled to the first coupling member to fix the cover to the first coupling member; and a buffer member interposed between at least one of a flange portion of the first coupling member and the inner ring, or the base and the inner ring, to buffer vibrations and impacts, the buffer member comprising a plate having a predetermined strength, and a damping member disposed on one or more of opposing side surfaces of the plate.

17. The apparatus according to claim 16, wherein:

the plate has a groove with uniform depth and width positioned coaxially with the plate; and the damping member is disposed in the groove.

18. The apparatus according to claim 16, wherein:

the plate has a predetermined strength; and a damping member is disposed on one or more of opposing side surfaces of the plate.

19. An actuator supporting apparatus of a hard disk drive that includes a housing having a base and a cover, the apparatus comprising:

a pivot bearing including an inner ring, an outer ring, and a rolling member, which are installed coaxially, to pivotably support an actuator arm of the actuator supporting apparatus;

a support structure having a first coupling member coupled to the base to support the inner ring accommodated by the base, and a second coupling member coupled to the first coupling member to fix the cover to the first coupling member; and a buffer member interposed between at least one of a flange portion of the first coupling member and the inner ring, or the base and the inner ring, to buffer vibrations and impacts, the buffer member comprising a plate having a groove with uniform depth and width positioned coaxially with the plate, and a damping member disposed in the groove.

* * * * *